US009945485B2

(12) United States Patent
Miller et al.

(10) Patent No.: US 9,945,485 B2
(45) Date of Patent: Apr. 17, 2018

(54) SEAL ASSEMBLY FOR A STERILE ENVIRONMENT

(71) Applicant: Trelleborg Sealing Solutions US, Inc., Fort Wayne, IN (US)

(72) Inventors: Timothy F. Miller, Thornton, CO (US); Christopher Berg, Frederick, CO (US)

(73) Assignee: Trelleborg Sealing Solutions US, Inc., Fort Wayne, IN (US)

( * ) Notice: Subject to any disclaimer, the term of this patent is extended or adjusted under 35 U.S.C. 154(b) by 0 days.

(21) Appl. No.: 15/146,111

(22) Filed: May 4, 2016

(65) Prior Publication Data

US 2016/0327159 A1    Nov. 10, 2016

Related U.S. Application Data

(60) Provisional application No. 62/156,525, filed on May 4, 2015.

(51) Int. Cl.
| | |
|---|---|
| *F16J 15/40* | (2006.01) |
| *F16J 15/00* | (2006.01) |
| *B01F 15/00* | (2006.01) |
| *F16C 33/76* | (2006.01) |
| *B01F 7/00* | (2006.01) |

(52) U.S. Cl.
CPC ............ *F16J 15/40* (2013.01); *F16J 15/008* (2013.01); *B01F 7/00* (2013.01); *B01F 2015/00097* (2013.01); *F16C 33/76* (2013.01)

(58) Field of Classification Search
CPC ...................... F16J 15/40; F16J 15/008; B01F 2015/00097; F16C 33/76

USPC ......................................................... 277/304
See application file for complete search history.

(56) References Cited

U.S. PATENT DOCUMENTS

| 3,476,395 A | * | 11/1969 | Cornelius | ............... F16C 33/76 |
| | | | | 277/350 |
| 3,511,513 A | * | 5/1970 | Dahlheimer | ........... F16J 15/002 |
| | | | | 277/353 |
| 3,910,833 A | * | 10/1975 | Knighton | .................. C25C 7/00 |
| | | | | 204/273 |

(Continued)

FOREIGN PATENT DOCUMENTS

| JP | 01309633 A | * | 12/1989 | ................ B01F 7/04 |
| JP | 2005-133852 A | | 5/2005 | |

(Continued)

OTHER PUBLICATIONS

Notification of Transmittal of the International Search Report and the Written Opinion of the International Searching Authority, or the Declaration dated Aug. 12, 2016 for International Application No. PCT/US2016/030698 (10 pages).

*Primary Examiner* — Eugene G Byrd
(74) *Attorney, Agent, or Firm* — Taylor IP, P.C.

(57) ABSTRACT

A seal assembly includes a seal body having a space formed therein; a seal carrier held within the space, the seal carrier being selectively positionable between a sealing position and a rotation position by moving along a carrying path; at least one seal carried by the seal carrier; and a hermetic seal held within the space out of the carrying path of the seal carrier, the hermetic seal being configured to be abraded away by a rotating element that the hermetic seal is pressing against.

19 Claims, 5 Drawing Sheets

(56) References Cited

U.S. PATENT DOCUMENTS

| | | | | |
|---|---|---|---|---|
| 3,915,459 A * | 10/1975 | Kunderman | ............ | F01D 11/00 |
| | | | | 277/411 |
| 4,106,779 A * | 8/1978 | Zabcik | .................... | E21B 17/07 |
| | | | | 175/293 |
| 4,202,553 A * | 5/1980 | Kropp | ...................... | F16J 15/54 |
| | | | | 277/366 |
| 4,815,747 A | 3/1989 | Wolford | | |
| 4,854,598 A | 8/1989 | Deuring | | |
| 5,026,077 A * | 6/1991 | Warner | ................ | F16J 15/3464 |
| | | | | 277/390 |
| 5,108,715 A * | 4/1992 | Jekat | ..................... | F04D 13/024 |
| | | | | 277/358 |
| 5,188,377 A * | 2/1993 | Drumm | ................ | F16J 15/3488 |
| | | | | 277/353 |
| 5,538,649 A | 7/1996 | Demendi et al. | | |
| 5,927,722 A * | 7/1999 | Carmody | ............. | F16J 15/3484 |
| | | | | 277/368 |
| 6,517,077 B1 * | 2/2003 | Enomura | ............. | F16J 15/3448 |
| | | | | 277/358 |
| 1,857,319 A1 | 12/2010 | Steigerwald et al. | | |
| 1,901,934 A1 | 3/2011 | Kunas et al. | | |
| 2003/0085526 A1 * | 5/2003 | Kim | ....................... | F16J 15/002 |
| | | | | 277/390 |
| 2004/0007821 A1 * | 1/2004 | Ramsay | ................. | F16J 15/008 |
| | | | | 277/353 |
| 2005/0253340 A1 * | 11/2005 | Ramsay | ................. | F16J 15/008 |
| | | | | 277/559 |
| 2006/0261559 A1 | 11/2006 | Kudari et al. | | |
| 2008/0122181 A1 * | 5/2008 | Grimanis | ............. | F16J 15/3232 |
| | | | | 277/308 |
| 2008/0240949 A1 * | 10/2008 | Tackett | .................... | F04B 15/04 |
| | | | | 417/437 |
| 2010/0090412 A1 | 4/2010 | Scott et al. | | |
| 2012/0127825 A1 * | 5/2012 | Kojima | ..................... | B01F 7/18 |
| | | | | 366/331 |
| 2013/0101982 A1 | 4/2013 | Goodwin et al. | | |

FOREIGN PATENT DOCUMENTS

| | | |
|---|---|---|
| JP | 2010-230032 A | 10/2010 |
| JP | 2013-127320 A | 6/2013 |

* cited by examiner

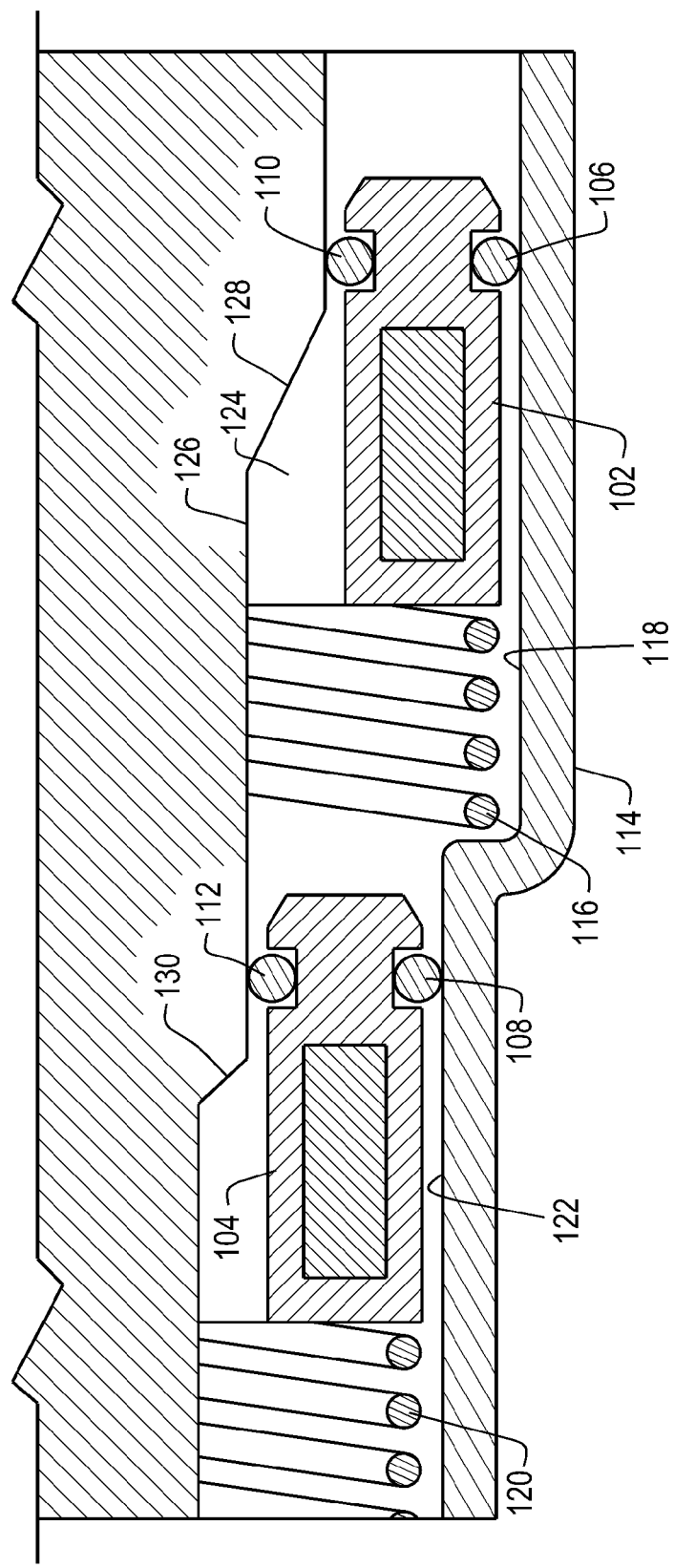

SEAL ASSEMBLY FOR A STERILE ENVIRONMENT

CROSS REFERENCE TO RELATED APPLICATIONS

This is a non-provisional application based upon U.S. provisional patent application Ser. No. 62/156,525, entitled "SEAL ASSEMBLY FOR A STERILE ENVIRONMENT", filed May 4, 2015, which is incorporated herein by reference.

BACKGROUND OF THE INVENTION

1. Field of the Invention

The present invention relates to seals, and, more particularly, to seals for maintaining a sterile environment.

2. Description of the Related Art

Certain products, especially those in the pharmaceutical and food industries, require high degrees of sterility in the manufacturing process so the products are safe for users to consume. Manufacturing such products typically occurs in designated "clean rooms" where the environment and equipment is strictly controlled to prevent the introduction of foreign organisms and debris into the products during the manufacturing process. Maintaining the sterility in cleans rooms can be achieved by a combination of industry and government prescribed good manufacturing practices (GMP) and facility control to minimize the risk of contamination in the products.

Since maintaining the sterility of an entire room where many employees may be entering and leaving throughout a production run is often impractical, sterile products are typically produced in specially designed devices, such as bio-reactors, that are sealed to the outside environment. Introduction of material into the bio-reactor is limited to a few entryways so the risk of introducing foreign organisms and debris into the bio-reactor can be minimized. Each entryway is sealed when material is not being intentionally introduced to prevent contamination of the product inside the bio-reactor.

One particular problem with manufacturing products in a bio-reactor is the difficulty in mixing or otherwise agitating the sterile contents inside the bio-reactor. Typically the contents are agitated by a paddle or other instrument which is driven by a motor residing outside of the sterile environment. The agitating instrument is not typically left inside the bio-reactor during the entire production run, which can last months, as the contents of the bio-reactor can react with the material of the instrument and ruin the contents of the bio-reactor. Thus, the agitating instrument is usually only placed in the bio-reactor to agitate the contents at pre-determined intervals in the production run.

To maintain the sterile environment while the agitating instrument is being used to agitate the contents of the bio-reactor, a "pass-through" can be used that will seal against the moving surface of the agitating instrument to maintain the sterile environment. Known pass-throughs are effective to maintain sterility during one agitation of the bio-reactor contents, but must be replaced following agitation. This is inconvenient for manufacturing, since the pass-throughs must be replaced after each agitation, and also introduces another possible contamination event, since contamination can occur during the replacement process or the new pass-through might not be properly sanitized. Further, the contents of the bio-reactor may be held in sterile containers, such as polymer bags, within the bio-reactor and later transported to a different bio-reactor following agitation. Known pass-throughs do not allow the contents of the sterile bag to be agitated, transported to a different bio-reactor, and then agitated again, all while maintaining the sterile environment in the bag, without replacing the pass-through at least once.

What is needed in the art is a seal assembly for maintaining a sterile environment that can overcome some of the previously described disadvantages of known seal assemblies.

SUMMARY OF THE INVENTION

The present invention provides a seal assembly with at least one seal carried by a seal carrier between a sealing position and a rotation position and a hermetic seal configured to be abraded away by a rotating element that the hermetic seal is pressing against.

The invention in one form is directed to a seal assembly including: a seal body having a space formed therein; a seal carrier held within the space, the seal carrier being selectively positionable between a sealing position and a rotation position by moving along a carrying path; at least one seal carried by the seal carrier; and a hermetic seal held within the space out of the carrying path of the seal carrier, the hermetic seal being configured to be abraded away by a rotating element that the hermetic seal is pressing against.

The invention in another form is directed to an agitating assembly including a shaft and a seal assembly placed on the shaft. The seal assembly includes a seal body having a space formed therein, the shaft occupying a portion of the space; a seal carrier held within the space, the seal carrier being selectively positionable between a sealing position and a rotation position by moving along a carrying path; at least one seal carried by the seal carrier; and a hermetic seal held within the space out of the carrying path of the seal carrier and sealing against the shaft, the hermetic seal being configured to abrade away during rotation of the shaft.

The invention in yet another form is directed to a method of maintaining a sterile environment which includes the steps of: providing a seal assembly including a space formed therein, a seal carrier within the space having a sealing position and a rotation position and defining a carrying path, at least one seal carried by the seal carrier, and a hermetic seal held within the space outside of the carrying path; forming a seal against a rotatable element with the at least one seal in the sealing position and the hermetic seal; actuating the seal carrier from the sealing position to the rotation position; rotating the rotatable element, the hermetic seal abrading away during the rotation; and actuating the seal carrier from the rotation position to the sealing position.

An advantage of the present invention is the seal carried by the seal carrier can maintain sterility after the hermetic seal is abraded away, allowing the pass-through to maintain sterility during multiple agitations.

Another advantage is more than one seal carried by one or more seal carriers can allow for a high number of agitations before the seal assembly can no longer maintain sterility.

Yet another advantage is purging gas can be introduced into the space to maintain a positive pressure within the space that keeps contaminants out of the space while the rotating element rotates.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 5 is a cross-sectional view of another embodiment of a seal assembly formed according to the present invention which has multiple seals carried by multiple seal carriers.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
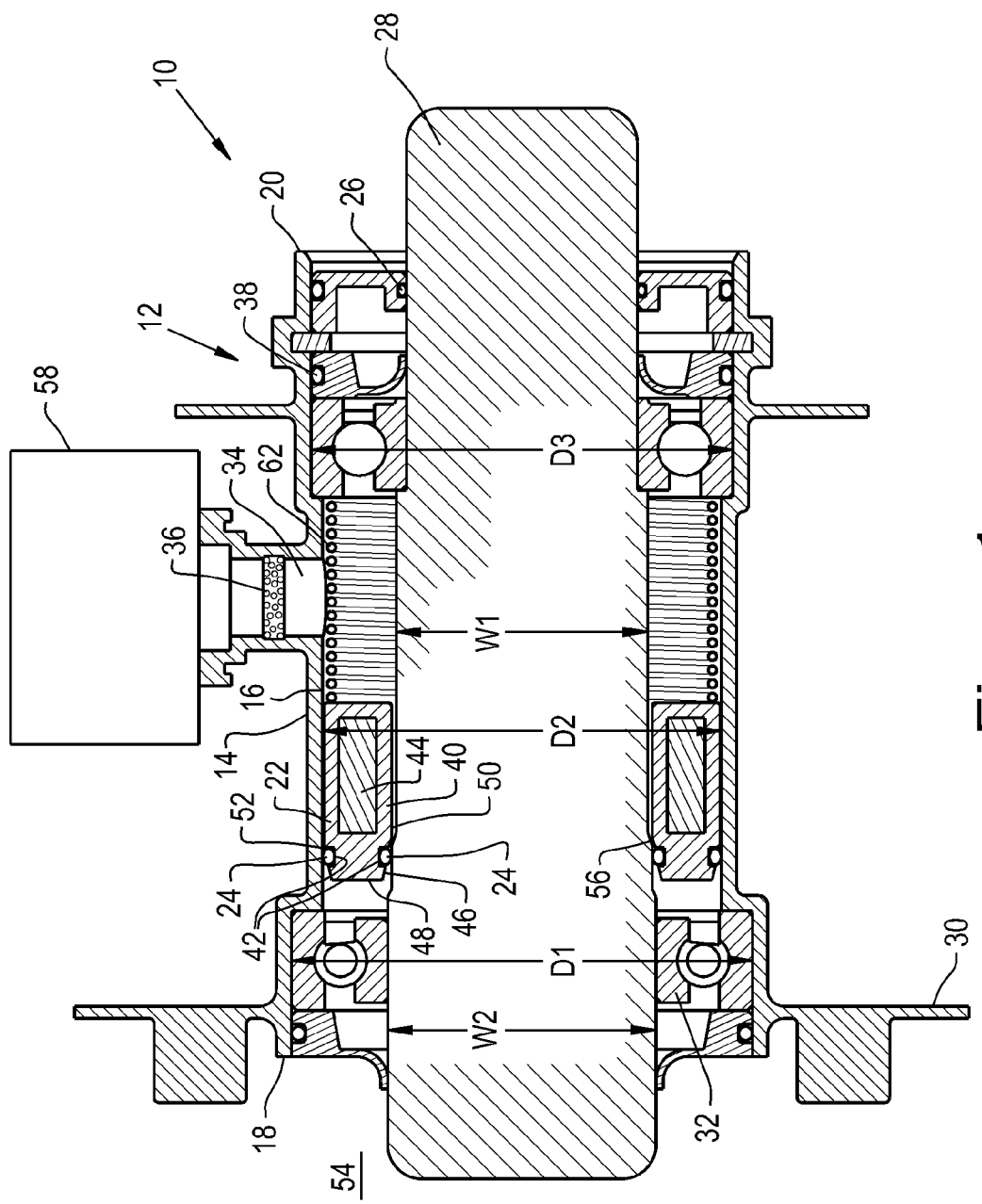
FIG. 1 is a cross-sectional view of a portion of an embodiment of an agitating assembly formed according to the present invention with a seal carrier in a sealing position.

Referring now to the drawings, and more particularly to FIG. 1, there is shown an embodiment of an agitating assembly 10 formed according to the present invention including a seal assembly 12 for a sterile environment which generally includes a seal body 14 with a space 16 formed in the seal body 14 from one end 18 of the seal body 14 to an opposite end 20 of the seal body 14, a seal carrier 22 held within the space 16 of the seal body 14 that can be selectively positioned in a sealing position and a rotation position and defines a carrying path, at least one seal 24 carried by the seal carrier 22, and a hermetic seal 26 held within the space 16 of the seal body 14 out of the carrying path of the seal carrier 22. The seal assembly 12, which can be referred to as a "pass-through," can be placed on a shaft 28 so the shaft 28 is inserted through the space 16 of the seal body 14, with the seal(s) 24 and hermetic seal 26 sealing around the shaft 28, which will be described further therein. The seal body 14 can include a mounting flange 30 at one end 18 that can mount to a sterile environment, such as a sterile bag of a bio-reactor or a food mixer, to hold the seal assembly 12 over the shaft 28, which will be placed in the sterile environment to rotate. The seal body 14 can also have one or more bearings 32 held in the space 16 to stabilize the shaft 28 when it is inserted in the space 16. As shown, the seal body 14 can have a generally cylindrical shape with varying diameters D1, D2, D3 throughout to accommodate the various components of the seal assembly 14. A gas port 34 can be formed in the seal body 14 that connects to a portion of the space 16 which is between the seal carrier 22 and the hermetic seal 26, which will be described further herein, and a filtering membrane 36 can be placed in the gas port 34. The gas port 34 can be formed in the seal body 14 in various locations, as shown throughout the figures. Additional seals 38 not contacting the dynamic surface of the shaft 28 can also be placed in the space 16 of the seal body 14 to help maintain sterility. Since the seal body 14 will typically be used to maintain a sterile environment, the seal body 14 can be formed using materials and techniques that follow good manufacturing practices (GMP) and allow for sterilization of the seal assembly 12 using one or more common techniques such as irradiation, ethylene trioxide (EtO) sterilization, dry-heat sterilization, and autoclaving.

The seal carrier 22 is held in the space 16 of the seal body 14 and can be selectively positioned in a sealing position (shown in FIG. 1) and a rotating position (shown in FIG. 2), defining a carrying path between the two positions. The significance of the sealing position and the rotating position will be described further herein. As can be seen, the seal carrier 22 can include a carrier body 40 with an annular shape having seal grooves 42 in which the seals 24 are carried. To selectively position the seal carrier 22, the seal carrier 22 can include a magnetic core 44 formed from, for example, a ferrous material that allows a magnetized actuator outside the seal body 14 to interact with the magnetic core 44 and cause the seal carrier 22 to slide within the space 16 of the seal body 14 without needing to place a mechanical actuator in the seal body 14. The carrying path, therefore, is defined as the area where the seal carrier 22 can be actuated within the space 16 of the seal body 14 between the sealing position and rotating position. The seal carrier 22 can include a tapering portion 46 adjacent to the seal grooves where a width of the seal carrier 22 narrows toward a reduced diameter portion 48, with the seal grooves 42 being formed between the reduced diameter portion 48 and a full diameter portion 50 of the seal carrier 22. The seal carrier 22 can be formed of a similar material to the seal body 14 that can be sterilized.

As shown, two seals 24 are carried by the seal carrier 22. The seals 24 can be, for example, dynamic seals. One of the dynamic seals 24 can be placed in a seal groove 42 formed in an outer diameter of the seal carrier 22 to seal against a wall 52 of the seal body 14 and the other dynamic seal 24 can be placed in a seal groove 42 formed in an inner diameter of the seal carrier 22 to seal against the shaft 28. It should be appreciated that only one or more than two seals 24 can be carried by the seal carrier 22. The seals 24 can be formed in any way that allows them to seal against the wall 52 of the seal body 14 and the shaft 28 to keep fluid 54 in the sterile environment from leaking out of the sterile environment or becoming contaminated by non-sterile contaminants. The seals 24 can be formed of, for example, rubber, polytetrafluoroethylene (PTFE), or other materials that can form a seal and be kept sterile.

Figure 2:
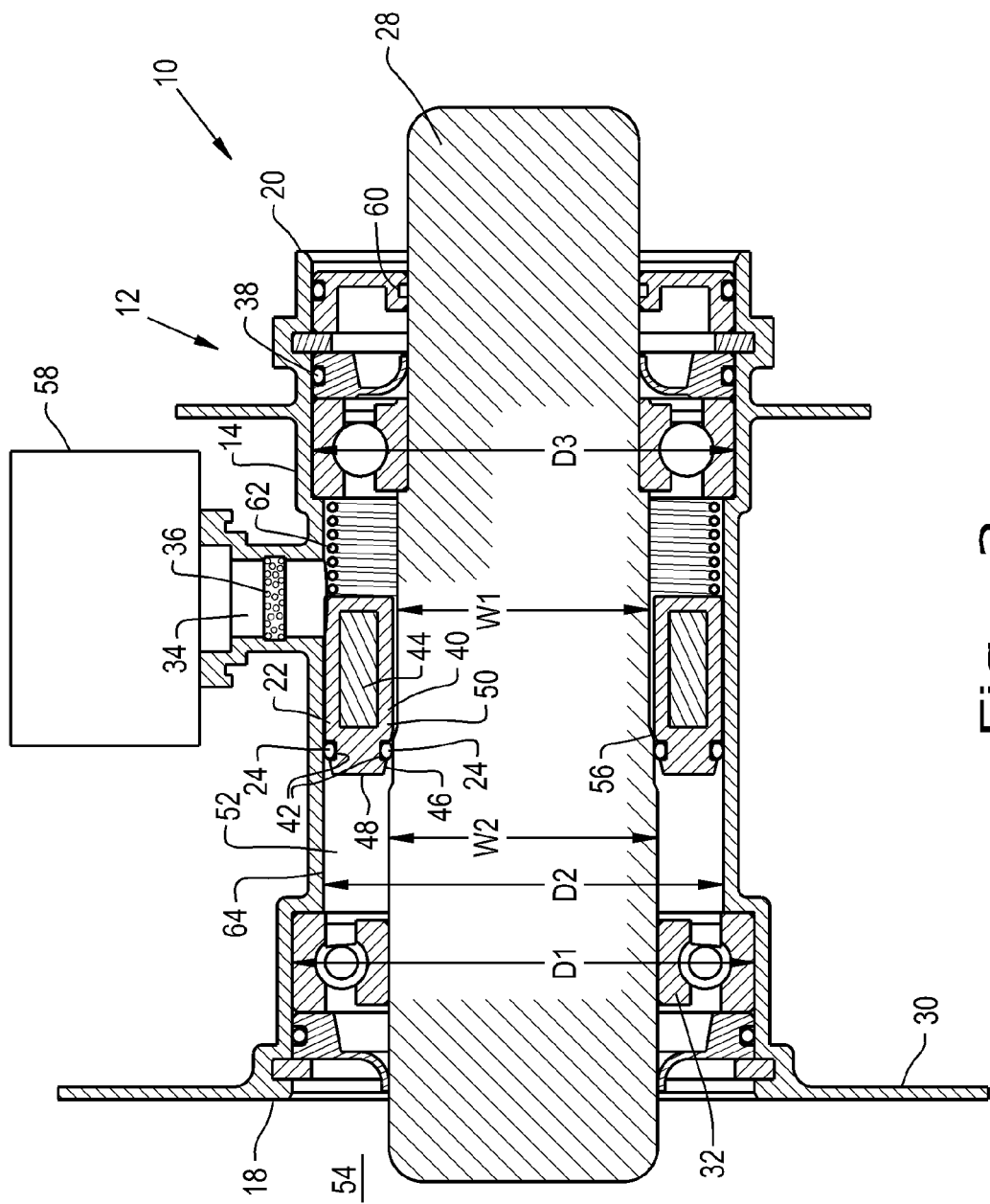
FIG. 2 is a cross-sectional view of the agitating assembly shown in FIG. 1 with the seal carrier in a rotation position.

Referring now to FIGS. 1 and 2, it can be seen that the seal carrier 22 carrying the seals can be actuated, magnetically or otherwise, between the sealing position shown in FIG. 1 and the rotating position shown in FIG. 2. As shown, the shaft 28 that is sealed by the inner diameter seal 24 can have a shaft taper 56 where the shaft goes from a first width W1 to a second width W2, with the second width W2 being greater than the first width W1 and closer to the mounting flange 30. When the seal carrier 22 and carried seals 24 are in the sealing position, the seals 24 tightly press against the second width W2 of the shaft 28 and prevent rotation of the shaft 28. However, when the seal carrier 22 is actuated to the rotating position, the carried seals 24 are no longer tightly pressed against the shaft 28, since the first width W1 is less than the second width W2, allowing the shaft 28 to be freely rotated but also allowing contaminants to possibly enter the sterile environment without additional sealing.

To provide additional sealing to prevent contaminant entry into the sterile environment when the seal carrier 22 and carried seals 24 are in the rotating position, a hermetic seal 26 is held in the space 16 of the seal body 14 that provides a static, hermetic seal to prevent entry of any foreign contaminants into the space 16 of the seal body 14 and the sterile environment. The hermetic seal 26 can be a static seal that is not intended to rotate, i.e., the hermetic seal 26 will be abraded away and no longer provide a seal when the shaft 28 rotates. The hermetic seal 26 can be formed as any type of hermetic seal that seals around the shaft 28 and prevents entry of air and other contaminants into the space 16 of the seal body 14. Since the hermetic seal 26 is intended to statically seal against the shaft 28, the hermetic seal 26 should be held inside the space 16 outside of the carrying path so that movement of the seal carrier 22 and carried seals 24 does not affect the function of the hermetic seal 26. Similar to the seal body 14 and carried seals 24, the hermetic seal 26 can be formed of a material that allows the hermetic seal 26 to be manufactured using GMP and can be sterilized.

To use the seal assembly 12 to maintain sterility, the seal assembly 12 is first mounted to the sterile environment with the seal carrier 22 in the sealing position, such as by mounting the mounting flange 30 to a sterile bag with sterile contents inside. The seal assembly 12 can be mounted with the shaft 28 already passed through the seal assembly 12 or the shaft 28 can be passed through the seal assembly 12 after the seal assembly 12 is mounted. When rotation of the shaft 28 is desired, the seal carrier 22 is actuated, magnetically or otherwise, to the rotating position. At this point, the carried seals 24 are no longer tightly sealing the sterile environment, but the sterile environment within the space 16 of the seal body 14 has been maintained by the hermetic seal 26 so no outside contaminants enter into the sterile environment. The sterile environment can be further maintained by introducing sterile purging gas from a purging gas supply 58 through the gas port 34 and membrane 36 held in the gas port 34 to maintain a positive pressure within the space 16 of the seal body 14 and prevent entry of foreign contaminants into the space 16. The shaft 28 can then begin rotating to mix or otherwise agitate fluid 54 held in the sterile environment. As the shaft 28 rotates, the hermetic seal 26, which is statically held tightly against the shaft 28, can begin to abrade and form a gap 60 between the remaining material of the hermetic seal 26 and the shaft 28. This gap 60 formed between the hermetic seal 26 and shaft 28 provides an outlet for the gas from the gas supply 58 to exit so that a destructively high gas pressure is not created in the space 16. Once the shaft 28 has finished rotating, the seal carrier 22 and carried seals 24 can be returned to the sealing position by a spring 62 and the purging gas feed into the gas port 34 can be shut off. The purging gas supply 58 can be configured so that when the seal carrier 22 is in the sealing position, the gas supply 58 to the gas port 34 is automatically shut-off, or the gas supply 58 can be manually shut-off following the seal carrier 22 returning to the sealing position.

When the hermetic seal 26 is abraded so that it no longer hermetically seals against the shaft 28, the space 16 from the side of the hermetic seal 26 up to the carried seals 24 can be considered contaminated but space 64 past the carried seals 24, where the sterile environment is, can still be considered sterile. In this sense, the carried seals 24 form a boundary between sterile and contaminated environments when the hermetic seal 26 is abraded. Such a case may come up during transport of the sterile environment and its contents to a separate processing facility or room. After transport, or for other reasons, the shaft 28 may need to be rotated again to agitate or mix the contents in the sterile environment. To do this, purging gas can once again be forced into the gas port 34 to maintain a positive pressure in the space 16 of the seal body 14. The seal carrier 22 and carried seals 24 can then be actuated, magnetically or otherwise, again from the sealing position to the rotating position so the shaft 28 is free to rotate again. After the shaft 28 has finished rotating the second time, the seal carrier 22 and carried seals 24 can be returned to the sealing position and the purging gas can be shut off. At this point, the environment within the space 16 of the seal body 14 is no longer considered to be sterile and the seal assembly 12 can be disposed or replaced.

It should be appreciated that several variations of the seal assembly 12 shown in FIGS. 1 and 2 are contemplated. For example, the seal carrier 22 can be actuated in ways other than magnetically between the sealing and rotating positions, such as by using pressure created by the purging gas to simultaneously actuate the seal carrier 22 between the positions and create the positive pressure in the space 16. Further, the gas port 34 can be rendered unnecessary by pre-pressurizing the space 16 inside the seal body 14 with sufficient sterile purging gas to maintain a positive pressure in the seal body 14 after the hermetic seal 26 has been abraded by the shaft 28 rotating and one or more additional rounds of shaft rotation following hermetic seal 26 abrading away. It is also contemplated that the gas pressure built up in the space 16 of the seal body 14 by the purging gas inflow into the gas port 34 can be sufficient to keep a positive pressure inside the space 16 during transport and one or more additional rounds of shaft rotation following the hermetic seal 26 abrading away. The seal carrier 22 may also not move the bulk of the seals 24 between the sealing and rotating positions, but only a sealing portion of the seals 24. For example, the seal carrier 22 may be a magnetically actuated element abutting against seal lips (not shown) of the seals 24 that can be selectively positioned between a sealing position where the seal carrier 22 presses the seal lips against the shaft 28 and wall 52 of the seal body 14 and a rotating position where the seal carrier 22 no longer presses the seal lips against the shaft 28 and wall 52 of the seal body 14.

Figure 3:
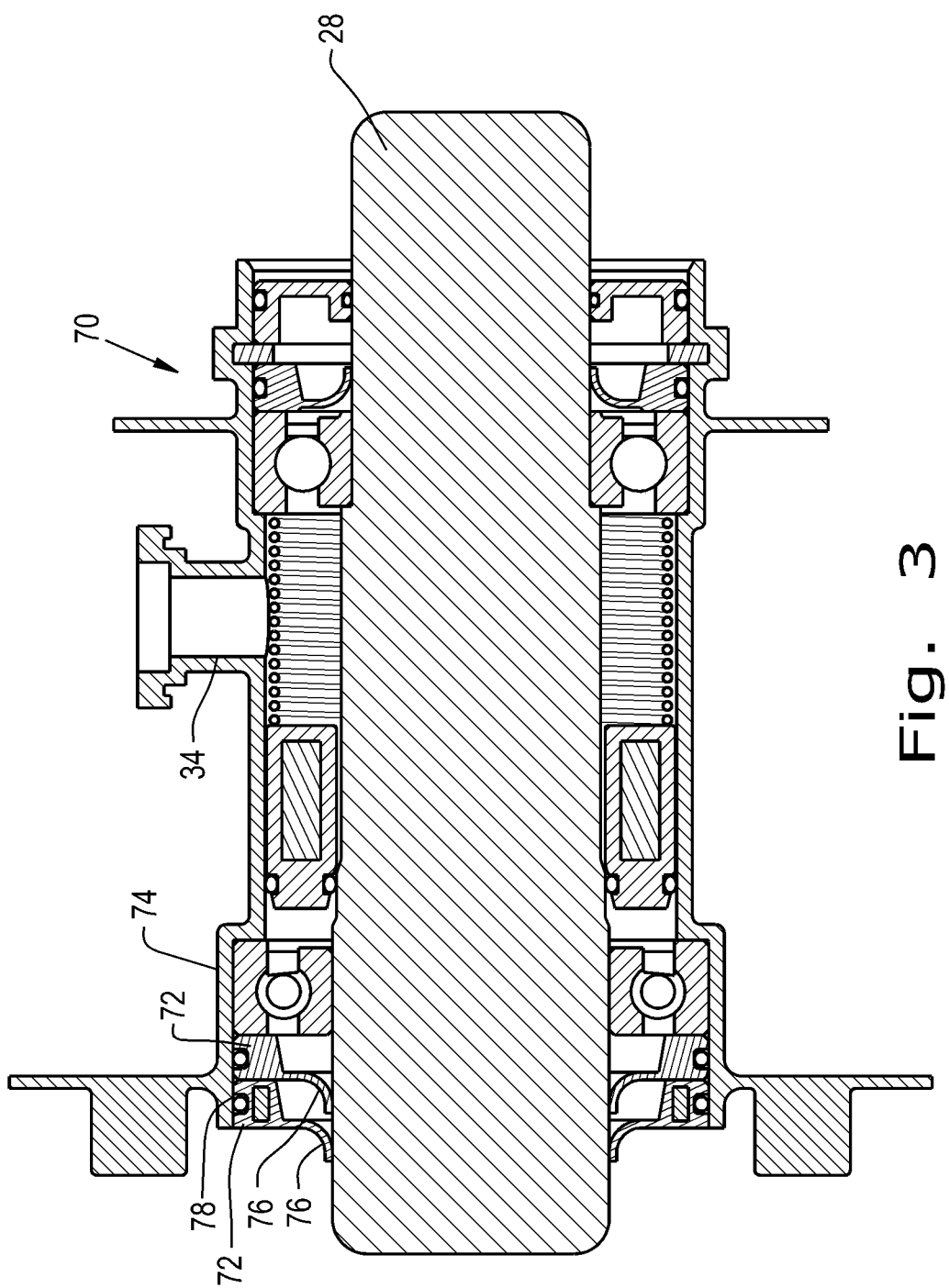
FIG. 3 is a cross-sectional view of a portion of another embodiment of an agitating assembly formed according to the present invention.

While the seal assembly 12 shown in FIGS. 1 and 2 is mostly contemplated for use above a fluid level held in the sterile environment, it is contemplated that there may be instances where sterile sealing is desired in a location where fluid pressure forcing fluid into the seal assembly is a concern. Referring now to FIG. 3, another embodiment of a seal assembly 70 for maintaining such a sterile environment is shown. The seal assembly 70 shown in FIG. 3 is similar to the seal assembly 12 shown in FIGS. 1 and 2, with the addition of fluid seals 72 held in an enlarged diameter portion 74 of the seal body 14 opposite the hermetic seal 26 relative to the seal carrier 22. The fluid seals 72 have lips 76 that press against the shaft 28 and inner wall 78 of the enlarged diameter portion 74 of the seal body 14 to keep fluid out of the space 16 in the seal body 14. The lips 76 pressed against the shaft 28 can be flexible and dynamic so that the fluid seals 72 are low drag seals. The seal assembly 70 shown in FIG. 3 can be used substantially similarly to the seal assembly 12 shown in FIGS. 1 and 2, with a key differentiation being that the introduction of purging gas into the gas port 34 can also create a gas pressure that "lifts" the fluid seal lips 76 off the shaft 28 sufficiently to allow the shaft 28 to rotate. Once the purging gas pressure is removed, the fluid seal lips 76 can spontaneously return to pressing against the shaft 28 and create a fluid tight seal against the shaft 28.

Figure 4:
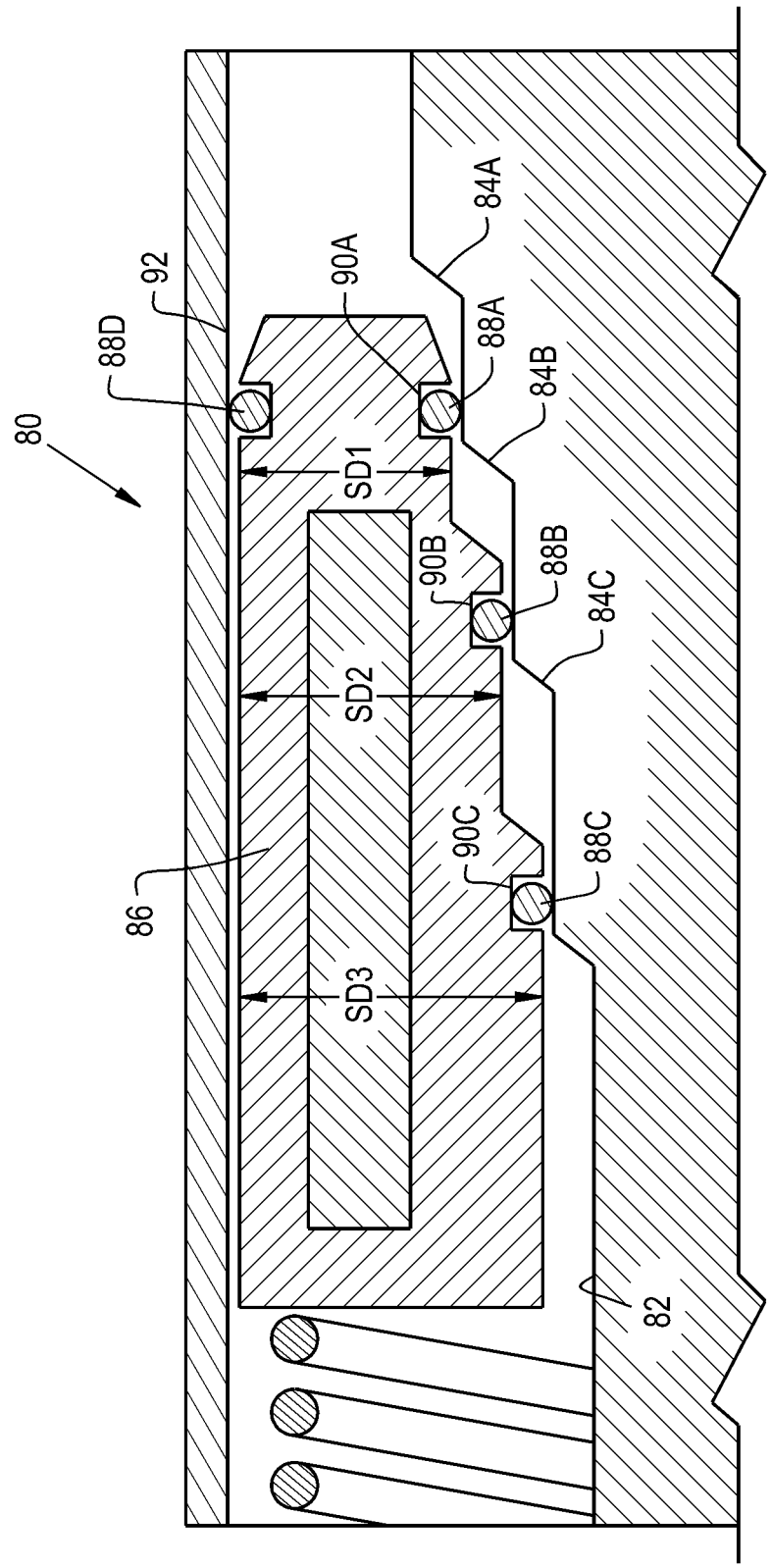
FIG. 4 is a cross-sectional view of an embodiment of a seal assembly formed according to the present invention which has multiple seals carried by one seal carrier.

While the embodiments of seal assemblies 12, 70 shown in FIGS. 1-3 can be used for one stage of resealing, it is contemplated that more than one stage of resealing may be desired for various reasons. Referring now to FIG. 4, an embodiment of a portion of a seal assembly 80 for maintaining a sterile environment is shown that can have multiple stages of resealing. The seal assembly 80 shown in FIG. 4 can be substantially similar to the seal assemblies shown in FIGS. 1-3, but differ in that a shaft 82 being sealed by the seal assembly 80 has multiple tapering portions 84A, 84B, 84C and the seal assembly 80 has a seal carrier 86 which carries multiple seals 88A, 88B, 88C that can press against the shaft 82, depending on the position of the seal carrier 86 in the carrying path. As can be seen, each carried seal 88A, 88B, 88C held against the shaft 82 is carried in a shaft seal groove 90A, 90B, 90C formed into varying diameters SD1, SD2, SD3 of the seal carrier 86. The seal carrier 86 also carries a wall seal 88D to seal against a wall 92 of the seal body. Since the wall 92 is linear with no relative changes in radius, only one wall seal 88D carried by the seal carrier 86 is required to seal against the wall 92, but more than one seal can be used to seal against the wall 92 of the seal body if desired. The seal assembly 80 shown in FIG. 4 can be used similarly to the seal assemblies 12, 70 shown in FIGS. 1-3, with each stage of resealing corresponding to a movement of the seal carrier 86 between the rotating position and sealing position and purging gas maintaining positive pressure in the space until the seal carrier 86 is back in the sealing position after the hermetic seal has been abraded. When three stages of resealing are desired, as shown in FIG. 4, the seal carrier 86 can be moved to the rotating position following hermetic seal abrasion and purging gas can be introduced into the space of the seal body. After the rotation is finished, the seal carrier 86 can be returned to the sealing position. After the first stage of resealing, the farthest left seal 88C pressed against the shaft 82 is contaminated, with the second seal 88B from the left pressing against the shaft 82 being a boundary between contaminated and sterile environments and the third seal 88A from the left pressing against the shaft 82 being in a sterile environment. After another stage of resealing, the second seal 88B from the left pressing against the shaft 82 is now contaminated and the third seal 88A from the left pressing against the shaft 82 is still considered sterile. Finally, after the third stage of resealing the seal assembly 80 is no longer considered sterile and can be disposed or replaced. It should therefore be appreciated that the number of seals 88A, 88B, 88C pressed against the shaft 82 can correspond to the number of resealing stages through which the seal assembly 80 can maintain sterility. To controllably move the seal carrier 86 during the resealing stages, magnetic or other types of actuation can be used to slide the seal carrier 86 along the shaft 82 and stop at the appropriate locations to achieve the desired number of resealing stages. For example, stops (not shown) can be placed in the carrying path at desired locations to keep the seal carrier 86 at the proper location relative to the shaft 82 during each resealing stage or the amount of actuation performed on the seal carrier 86 can be controlled during each resealing stage by controlling the actuator moving the seal carrier 86.

While the seal assembly 80 shown in FIG. 4 uses one seal carrier 86 to achieve multiple stages of resealing, it is contemplated that multiple seal carriers can also be used to achieve multiple stages of resealing. Referring now to FIG. 5, an embodiment of a seal assembly 100 is shown that includes a first seal carrier 102 and a second seal carrier 104, each carrying a wall seal 106, 108 and a shaft seal 110, 112. As can be seen, each seal carrier 102, 104 is similar to the single seal carrier shown in the embodiments of seal assemblies shown in FIGS. 1-3, so each stage of resealing can be performed similarly to the single stage of resealing of the seal assemblies shown in FIGS. 1-3. A seal body 114 can have varying diameters, with a first spring 116 pressed against the first seal carrier 102 in a reduced diameter portion 118 and a second spring 120 pressed against the second seal carrier 104 in an enlarged diameter portion 122. The difference in diameter and the springs 116, 120 act as natural limits to each seal carrier's carrying path, limiting the amount of movement each seal carrier 102, 104 can be displaced in a space 124 of the seal body 114. A shaft 126 that the shaft seals 110, 112 are pressed against can also have two tapering portions 128, 130, analogous to the single tapering portion shown in FIGS. 1-3, that will allow the carried shaft seals 110, 112 to either sealingly engage or disengage from the shaft 126 during stages of resealing. Each seal carrier 102, 104 can therefore be moved independently of the other seal carrier(s) 104, 102 in stages, with the unmoved seal carrier(s) 102, 104 maintaining sterility on a side opposite the abraded hermetic seal, which is not shown in FIG. 4 but can be located in similar locations, relative to the seal carriers 102, 104, as previously described and shown hermetic seals. It should therefore be appreciated that the number of stages of resealing desired can be controlled by altering the number of seal carriers and carried seals that are included in the seal assembly and how the seal carriers are actuated during stages of resealing.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A seal assembly, comprising:
a seal body having a space formed therein;
a seal carrier held within said space and including a magnetic material, said seal carrier being selectively positionable between a sealing position and a rotation position by moving along a carrying path;
at least one seal carried by said seal carrier; and
a hermetic seal held within said space out of said carrying path of said seal carrier, said hermetic seal being configured to be abraded away by a rotating element that said hermetic seal is pressing against.

2. The seal assembly according to claim 1, wherein said seal body includes a gas port formed therein.

3. The seal assembly according to claim 1, further comprising a spring biasing said seal carrier toward said sealing position.

4. The seal assembly according to claim 1, wherein said at least one seal carried by said seal carrier is a plurality of seals carried by said seal carrier.

5. The seal assembly according to claim 1, further comprising a second seal carrier held within said space and being selectively positionable between a second sealing position and a second rotation position by moving along a second carrying path and a second seal carried by said second seal carrier.

6. The seal assembly according to claim 1, further comprising a fluid seal placed in an enlarged diameter portion of said seal body.

7. An agitating assembly, comprising:
a shaft; and
a seal assembly placed on said shaft, said seal assembly including:
a seal body having a space formed therein, said shaft occupying a portion of said space;

a seal carrier held within said space and including a magnetic material, said seal carrier being selectively positionable between a sealing position and a rotation position by moving along a carrying path;

at least one seal carried by said seal carrier such that said at least one seal tightly presses against said shaft and said seal body to prevent free rotation of said shaft when said seal carrier is in said sealing position; and a hermetic seal held within said space out of said carrying path of said seal carrier and sealing against said shaft, said hermetic seal being configured to abrade away during rotation of said shaft.

8. The agitating assembly according to claim 7, wherein said at least one seal allows rotation of said shaft when said seal carrier is in said rotation position.

9. The agitating assembly according to claim 8, wherein said shaft has a first diameter and a second diameter which is greater than said first diameter, said at least one seal contacting said second diameter when said seal carrier is in said sealing position.

10. The agitating assembly according to claim 7, further comprising a purging gas supply connected to a gas port formed in said seal body.

11. The agitating assembly according to claim 10, wherein said purging gas supply is configured to dispense purging gas to said gas port when said seal carrier is in said rotation position.

12. A method of maintaining a sterile environment, comprising the steps of:

providing a seal assembly including a space formed therein, a seal carrier within said space, said seal carrier including a magnetic material and having a sealing position and a rotation position and defining a carrying path, at least one seal carried by said seal carrier, and a hermetic seal held within said space outside of said carrying path;

forming a seal against a rotatable element with said at least one seal in said sealing position and said hermetic seal;

actuating said seal carrier from said sealing position to said rotation position;

rotating said rotatable element, said hermetic seal abrading away during said rotation;

maintaining a positive pressure within said space during rotation of said rotatable element; and actuating said seal carrier from said rotation position to said sealing position while said positive pressure is present in said space such that said at least one seal forms a boundary between sterile and contaminated environments within said space when said positive pressure is removed.

13. The method according to claim 12, wherein said maintaining includes introducing purging gas into said space during rotation of said rotatable element.

14. The method according to claim 13, further comprising the step of stopping purging gas flow into said space when said seal carrier is actuated to said sealing position.

15. The method according to claim 12, further comprising the steps of:

actuating said seal carrier from said sealing position to said rotation position a second time; and rotating said rotatable element a second time.

16. The method according to claim 15, further comprising the steps of:

introducing purging gas into said space during rotations of said rotatable element; and stopping purging gas flow into said space when said seal carrier is actuated to said sealing position.

17. The method according to claim 15, further comprising the step of disposing said seal assembly after rotating said rotatable element the second time.

18. The agitating assembly according to claim 10, wherein said gas port is connected to a portion of said space between said seal carrier and said hermetic seal.

19. The method according to claim 12, wherein said abrading of said hermetic seal during said rotation forms a gap between said hermetic seal and said rotatable element which provides an outlet for said positive pressure in said space to escape.

* * * * *

UNITED STATES PATENT AND TRADEMARK OFFICE
CERTIFICATE OF CORRECTION

PATENT NO. : 9,945,485 B2  
APPLICATION NO. : 15/146111  
DATED : April 17, 2018  
INVENTOR(S) : Timothy F. Miller Page 1 of 1

It is certified that error appears in the above-identified patent and that said Letters Patent is hereby corrected as shown below:

On the Title Page

PAGE 2  
Item [56], Under Column 1 of U.S. PATENT DOCUMENTS delete "1,857,319 A1", and substitute therefore --7,857,319 A1--; and Item [56], Under Column 2 of U.S. PATENT DOCUMENTS delete "1,901,934 A1", and substitute therefore --7,901,934 A1--.

Signed and Sealed this  
Ninth Day of July, 2019

Andrei Iancu  
*Director of the United States Patent and Trademark Office*